(12) United States Patent
Okuoka

(10) Patent No.: US 11,635,602 B2
(45) Date of Patent: Apr. 25, 2023

(54) ZOOM LENS AND IMAGING APPARATUS INCLUDING THE SAME

(71) Applicant: CANON KABUSHIKI KAISHA, Tokyo (JP)

(72) Inventor: Shinya Okuoka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 16/879,536

(22) Filed: May 20, 2020

(65) Prior Publication Data

US 2020/0371326 A1    Nov. 26, 2020

(30) Foreign Application Priority Data

May 22, 2019   (JP) .............................. JP2019-095937

(51) Int. Cl.
*G02B 15/14* (2006.01)

(52) U.S. Cl.
CPC ................ *G02B 15/145523* (2019.08); *G02B 15/144511* (2019.08); *G02B 15/145519* (2019.08)

(58) Field of Classification Search
CPC .... G02B 15/144511; G02B 15/144515; G02B 15/145519; G02B 15/145523; G02B 15/145527; G02B 15/145531; G02B 15/1465
See application file for complete search history.

(56) References Cited

U.S. PATENT DOCUMENTS

| | | | |
|---|---|---|---|
| 2002/0181120 A1* | 12/2002 | Nagahara | G02B 15/145523 359/683 |
| 2019/0094490 A1* | 3/2019 | Gyoda | G02B 15/142 |
| 2020/0110251 A1* | 4/2020 | Gyoda | G02B 15/177 |
| 2020/0257181 A1* | 8/2020 | Gyoda | G03B 7/20 |

FOREIGN PATENT DOCUMENTS

| | | |
|---|---|---|
| CN | 1749799 A | 3/2006 |
| CN | 101320125 A | 12/2008 |
| CN | 104280864 A | 1/2015 |
| JP | 2001-117002 A | 4/2001 |
| JP | 2001-188172 A | 7/2001 |
| JP | 2009169082 A | 7/2009 |
| JP | 2015-34892 A | 2/2015 |
| JP | 2016-9113 A | 1/2016 |
| JP | 2016-54371 A | 4/2016 |
| JP | 2018-128523 A | 8/2018 |
| JP | 2018-189766 A | 11/2018 |
| JP | 2020-42221 A | 3/2020 |
| WO | 2016/121944 A1 | 8/2016 |

OTHER PUBLICATIONS

Ohara Glass Catalogue (Year: 2003).*
Schott Optical Glass description of properties (Year: 2011).*

* cited by examiner

*Primary Examiner* — George G. King
(74) *Attorney, Agent, or Firm* — Canon U.S.A., Inc. IP Division

(57) ABSTRACT

A zoom lens includes a first lens unit having negative refractive power, a second lens unit having positive refractive power, an intermediate unit including one or more lens units, and a final lens unit having positive refractive power disposed closest to the image side. The first lens unit includes negative lenses G1, G2 and G3 disposed in this order from an object side to an image side. The final lens unit includes at least one negative lens and a positive lens disposed closest to the image side. The zoom lens satisfies predetermined inequalities.

18 Claims, 7 Drawing Sheets

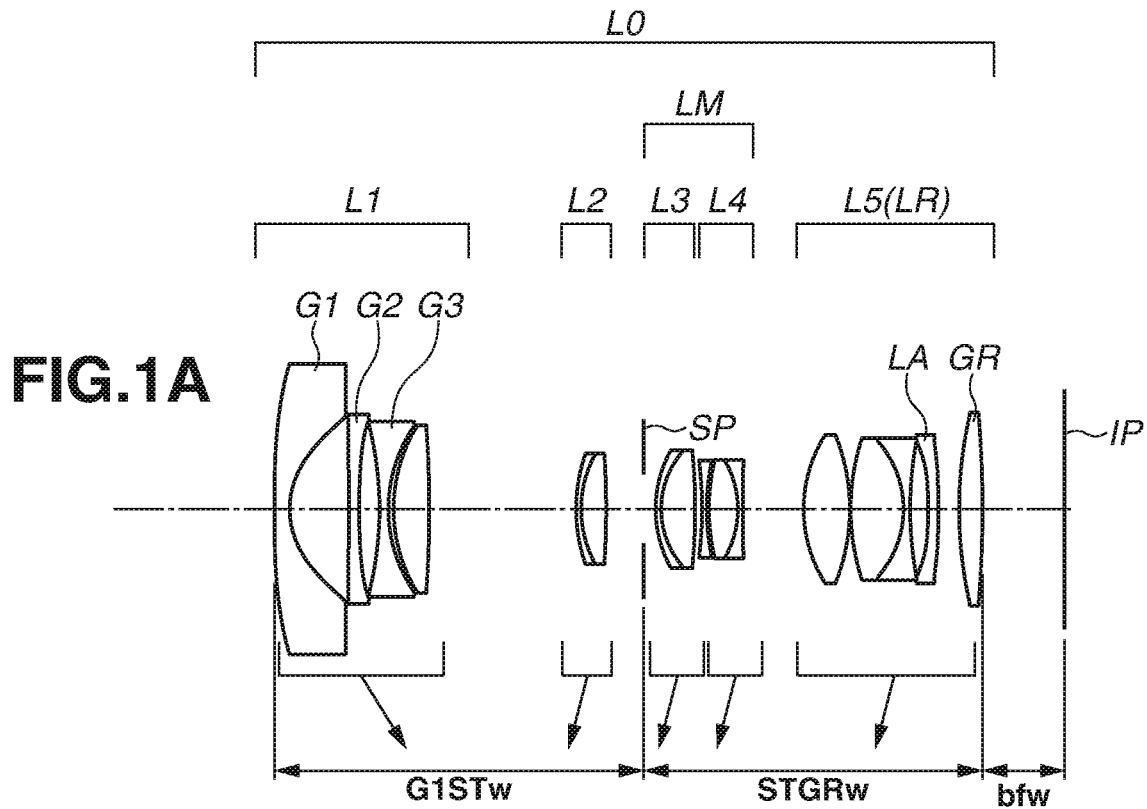

ZOOM LENS AND IMAGING APPARATUS INCLUDING THE SAME

BACKGROUND OF THE INVENTION

Field of the Invention

The aspect of the embodiments relates to a zoom lens which is suitable for imaging apparatuses, such as video cameras, still cameras, broadcasting cameras, silver-halide film cameras, and monitoring cameras.

Description of the Related Art

Wide-angle zoom lenses include negative lead type zoom lenses having a lens unit with negative refractive power disposed closest to an object side. Negative lead type zoom lenses make it easier to obtain a wide view angle and long back focus than positive lead type zoom lenses do.

WO 2016/121944 discusses a zoom lens including five lens units (a negative first lens unit, a positive second lens unit, a negative third lens unit, a positive fourth lens unit, and a positive fifth lens unit) disposed in this order from the object side to an image side.

A negative lead type zoom lens provides an asymmetrical lens configuration (refractive power arrangement) with respect to an aperture diaphragm, and thereby makes it difficult to favorably correct aberrations and therefore is likely to increase the size of the zoom lens. The zoom lens discussed in WO 2016/121944 is insufficient to achieve a good balance between downsizing and high optical performance.

SUMMARY OF THE INVENTION

According to an aspect of the embodiments, a zoom lens includes a first lens unit having negative refractive power, a second lens unit having positive refractive power, an intermediate unit including one or more lens units, and a final lens unit having positive refractive power disposed closest to an image side. The first lens unit, the second lens unit, the intermediate unit, and the final lens unit are disposed in this order from an object side to the image side. Intervals between adjacent lens units are changed during zooming. The first lens unit includes a negative lens G1, a negative lens G2, and a negative lens G3 disposed in this order from the object side to the image side. The final lens unit includes a negative lens and a positive lens GR disposed closest to the image side. The zoom lens satisfies the following inequalities:

$$0.000 < \theta gFGR - (-1.665 * 10^{-7} * vdGR^3 + 5.213 * 10^{-5} * vdGR^2 - 5.656 * 10^{-3} * vdGR + 0.7278) < 0.100,$$

$$0.50 < bfw/fw < 1.50, \text{ and}$$

$$-1.00 < fw/fl < -0.55,$$

where vdGR is an Abbe number of the positive lens GR, $\theta gFGR$ is a partial dispersion ratio of the positive lens GR, bfw is a distance from the image side surface of the positive lens GR at a wide-angle end, fw is a focal length of the zoom lens at the wide-angle end, and fl is a focal length of the first lens unit.

According to another aspect of the embodiments, an imaging apparatus includes a zoom lens, and an image sensor configured to photoelectrically convert an optical image formed by the zoom lens. The zoom lens includes a first lens unit having negative refractive power, a second lens unit having positive refractive power, an intermediate unit including one or more lens units, and a final lens unit having positive refractive power disposed closest to an image side. The first lens unit, the second lens unit, the intermediate unit, and the final lens unit are disposed in this order from an object side to the image side. Intervals between adjacent lens units are changed during zooming. The first lens unit includes a negative lens G1, a negative lens G2, and a negative lens G3 disposed in this order from the object side to the image side. The final lens unit includes a negative lens and a positive lens GR disposed closest to the image side. The zoom lens satisfies the following inequalities:

$$0.000 < \theta gFGR - (-1.665 * 10^{-7} * vdGR^3 + 5.213 * 10^{-5} * vdGR^2 - 5.656 * 10^{-3} * vdGR + 0.7278) < 0.100,$$

$$0.50 < bfw/fw < 1.50, \text{ and}$$

$$-1.00 < fw/fl < -0.55,$$

where vdGR is an Abbe number of the positive lens GR, $\theta gFGR$ is a partial dispersion ratio of the positive lens GR, bfw is a distance from the image side surface of the positive lens GR at a wide-angle end, fw is a focal length of the zoom lens at the wide-angle end, and fl is a focal length of the first lens unit.

Further features of the disclosure will become apparent from the following description of exemplary embodiments with reference to the attached drawings.

BRIEF DESCRIPTION OF THE DRAWINGS

FIGS. 1A, 1B and 1C illustrate cross-sectional views of a zoom lens according to a first exemplary embodiment.

DESCRIPTION OF THE EMBODIMENTS

Figure 2A:
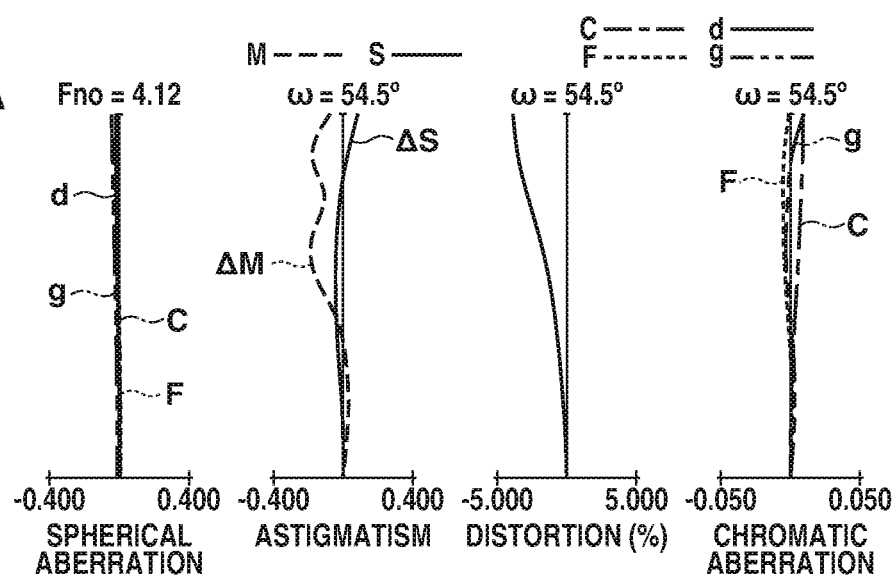
FIGS. 2A, 2B and 2C are aberration charts of the zoom lens according to the first exemplary embodiment.

Exemplary embodiments of a zoom lens and an imaging apparatus including the zoom lens according to the disclosure will be described below with reference to the accompanying drawings.

FIGS. 1A to 1C, FIGS. 3A to 3C, and FIGS. 5A to 5C illustrate cross-sectional views of zoom lenses according to the first, the second, and the third exemplary embodiments, respectively.

A zoom lens L0 according to each exemplary embodiment is used in imaging apparatuses (e.g., digital still cameras, video cameras, silver-halide film cameras, and broadcasting cameras) and projection apparatuses such as projectors. Referring to the cross-sectional views of the lenses, a left-hand side is an object side (enlargement side) and a right-hand side is an image side (reduction side).

Referring to each of the cross-sectional views of the lenses, Li (i is a natural number) denotes each lens unit disposed in an order from the object side to the image side. In the present exemplary embodiments, a lens unit denotes a component included in the zoom lens L0 and consists one or more lenses. In a zoom lens L0 according to each exemplary embodiment, an interval between adjacent lens units changes during zooming from the wide-angle end to the telephoto end.

An aperture diaphragm SP determines (limits) the light flux at a full aperture F-number (Fno). An image plane IP is displaced on an image pickup surface of an image sensor (photoelectric transducer), such as a charge coupled device (CCD) sensor or complementary metal oxide semiconductor (CMOS) sensor, when the zoom lens L0 is used in an imaging optical system, such as a video camera or digital still camera.

Referring to each of the cross-sectional views of lenses, downward arrows each indicate a simplified locus of movement drawn by each of the lens units during zooming from a wide-angle end to a telephoto end. In the present exemplary embodiments, the wide-angle end and the telephoto end each refer to a zoom position when each lens unit is positioned at either end of a mechanically movable range along the optical axis.

The zoom lens L0 according to each exemplary embodiment includes a first lens unit L1 having negative refractive power, a second lens unit L2 having positive refractive power, an intermediate unit LM including one or more lens units, and a final lens unit LR having positive refractive power. The final lens unit LR is disposed closest to the image side. These are disposed in this order from the object side to the image side. The intermediate unit LM includes all of the lens units that are disposed closer to the image side than the second lens unit L2 and closer to the object side than the final lens unit LR. The first lens unit L1 includes negative lenses G1, G2 and G3 disposed in this order from the object side to the image side. The final lens unit LR includes at least one negative lens, and a positive lens GR, which is disposed closest to the image side among lenses included in the final lens unit LR.

A zoom lens L0 according to a first exemplary embodiment includes a first lens unit L1, a second lens unit L2, a third lens unit L3 having positive refractive power, a fourth lens unit L4 having negative refractive power, and a fifth lens unit L5 having positive refractive power. In the zoom lens L0 according to the first exemplary embodiment, the third lens unit L3 and the fourth lens unit L4 correspond to the intermediate unit LM, and the fifth lens unit L5 corresponds to the final lens unit LR. During zooming from a wide-angle end to a telephoto end, the first lens unit L1 moves to the image side along a convex shaped locus, and the second lens unit L2, the third lens unit L3, the fourth lens unit L4, and the fifth lens unit L5 monotonously move to the object side. The third lens unit L3 and the fifth lens unit L5 included in the zoom lens L0 according to the first exemplary embodiment integrally move (along the same locus) during zooming. The zoom lens L0 performs focusing from an object point at infinity to an object point at a short distance by moving the second lens unit L2 along an optical axis.

A zoom lens L0 according to a second exemplary embodiment includes a first lens unit L1, a second lens unit L2, a third lens unit L3 having negative refractive power, and a fourth lens unit L4 having positive refractive power. In the zoom lens L0 according to the second exemplary embodiment, the third lens unit L3 corresponds to the intermediate unit LM, and the fourth lens unit L4 corresponds to the final lens unit LR. During zooming from a wide-angle end to a telephoto end, the first lens unit L1 moves to the image side along a convex shaped locus, and the second lens unit L2, the third lens unit L3, and the fourth lens unit L4 move to the object side. The second lens unit L2 includes a first subunit L21 and a second subunit L22 disposed in this order from the object side to the image side. The zoom lens L0 performs focusing from an object point at infinity to an object point at a short distance by moving the first subunit L21 along an optical axis.

A zoom lens L0 according to a third exemplary embodiment includes a first lens unit L1, a second lens unit L2, a third lens unit having negative refractive power, a fourth lens unit having negative refractive power, and a fifth lens unit having positive refractive power. In the zoom lens L0 according to the third exemplary embodiment, the third lens unit L3 and the fourth lens unit L4 correspond to the intermediate unit LM, and the fifth lens unit L5 corresponds to the final lens unit LR. During zooming from a wide-angle end to a telephoto end, the first lens unit L1 moves to the image side along a convex shaped locus, the second lens unit L2 monotonously moves to the object side. The third lens unit L3 moves to the object side along a convex shaped locus, the fourth lens unit L4 moves to the image side along a convex shaped locus, and the fifth lens unit LR monotonously moves to the object side. The second lens unit L2 includes a first subunit L21 and a second subunit L22 disposed in this order from the object side to the image side. The zoom lens L0 performs focusing from an object point at infinity to an object point at a short distance by moving the first subunit L21 along an optical axis.

The optical system according to each exemplary embodiment may function as an image stabilizing optical system which, in image shake correction, may parallelly decenter a part of the lenses or lens units in a vertical direction with respect to the optical axis. In addition, a parallel plate substantially having no refractive power, such as a low-pass filter or infrared cut filter, may be disposed between the lens disposed closest to the image side and the image pickup surface.

Figure 2B:
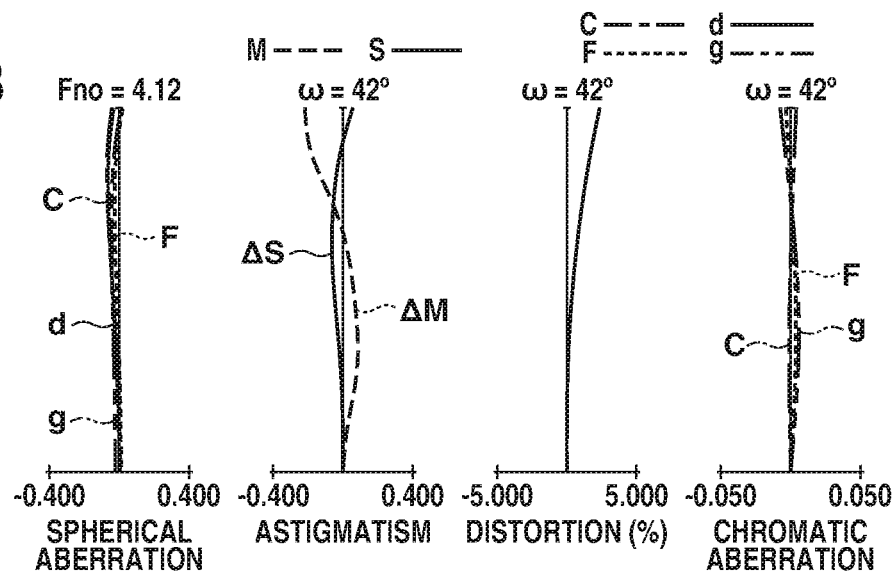
Figure 2C:
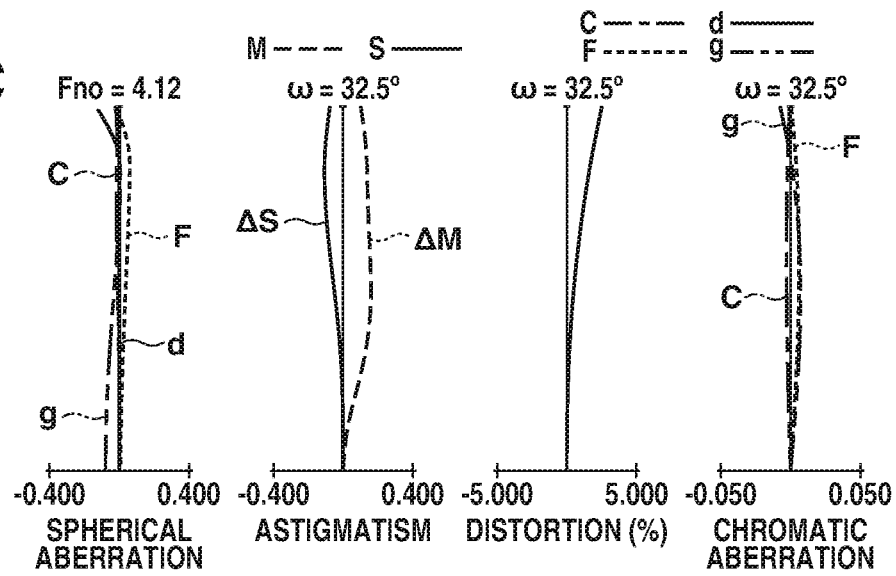
Figure 3A:
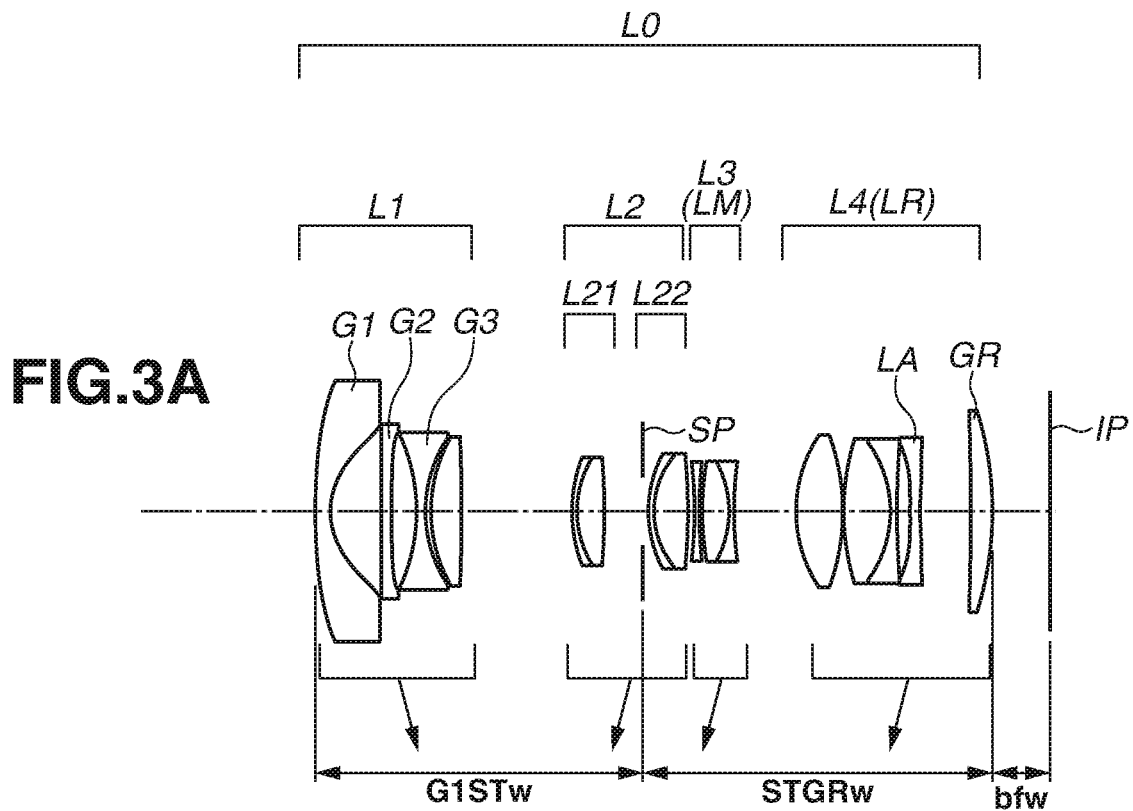
FIGS. 3A, 3B and 3C illustrate cross-sectional views of a zoom lens according to a second exemplary embodiment.
Figure 3B:
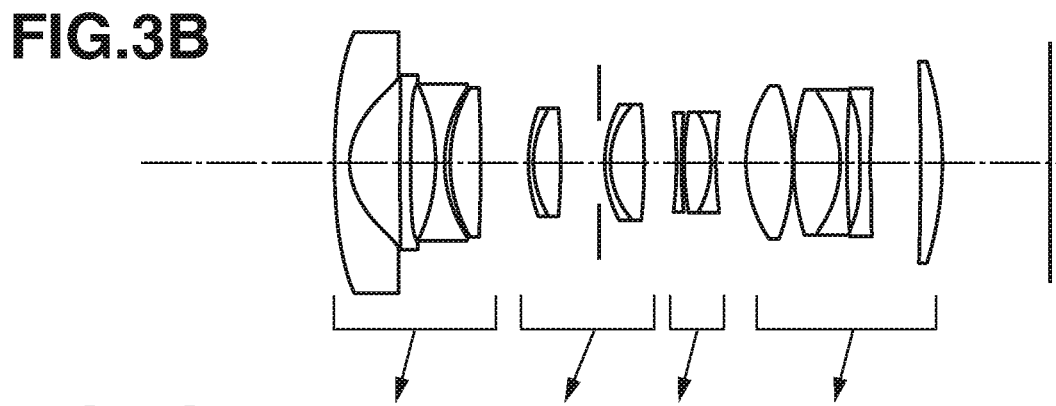
Figure 3C:
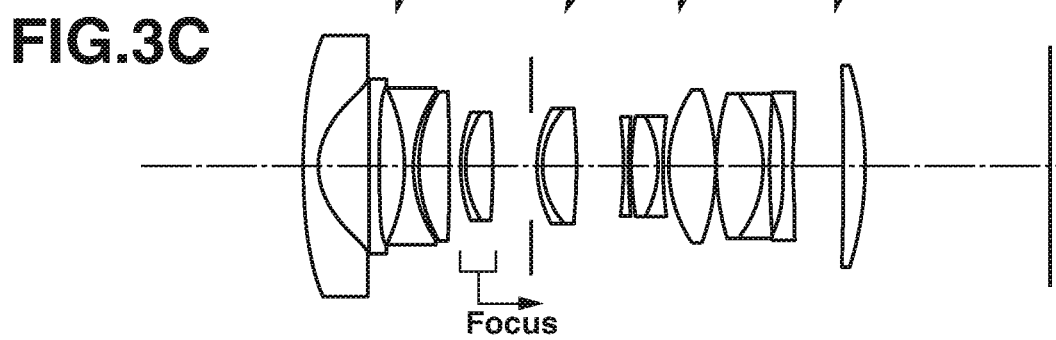
Figure 4A:
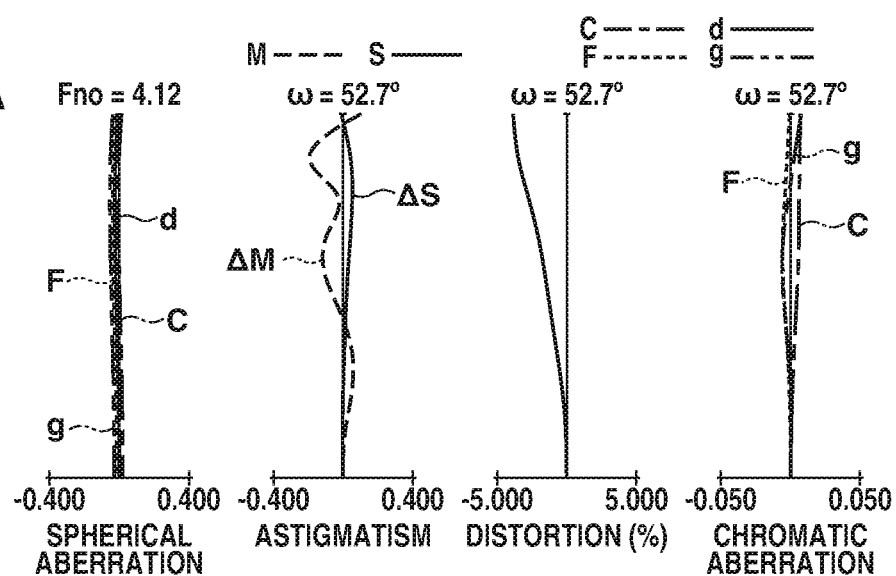
FIGS. 4A, 4B and 4C are aberration charts of the zoom lens according to the second exemplary embodiment.
Figure 4B:
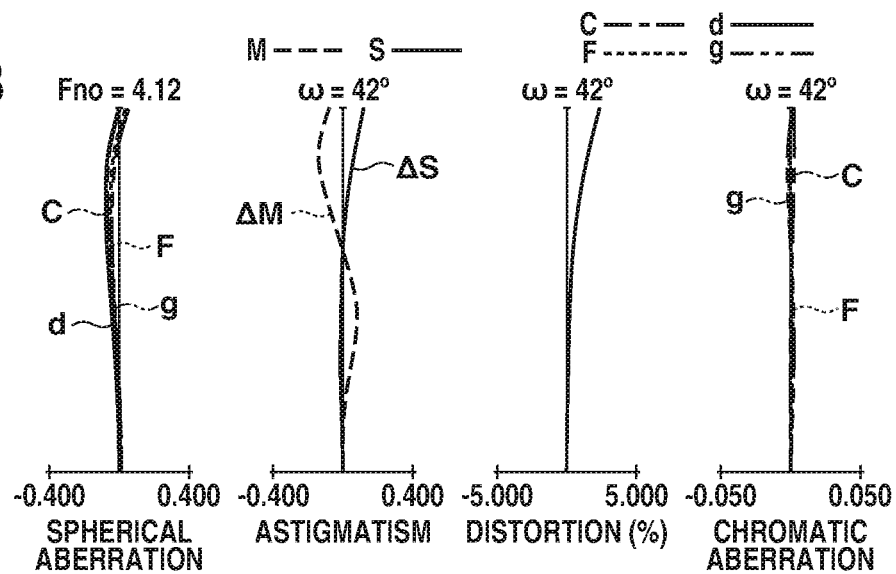
Figure 4C:
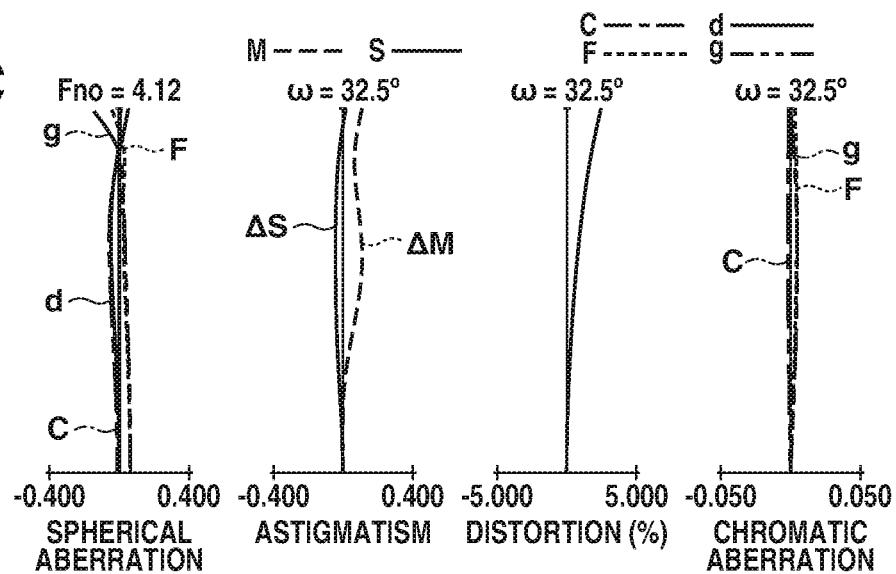
Figure 5A:
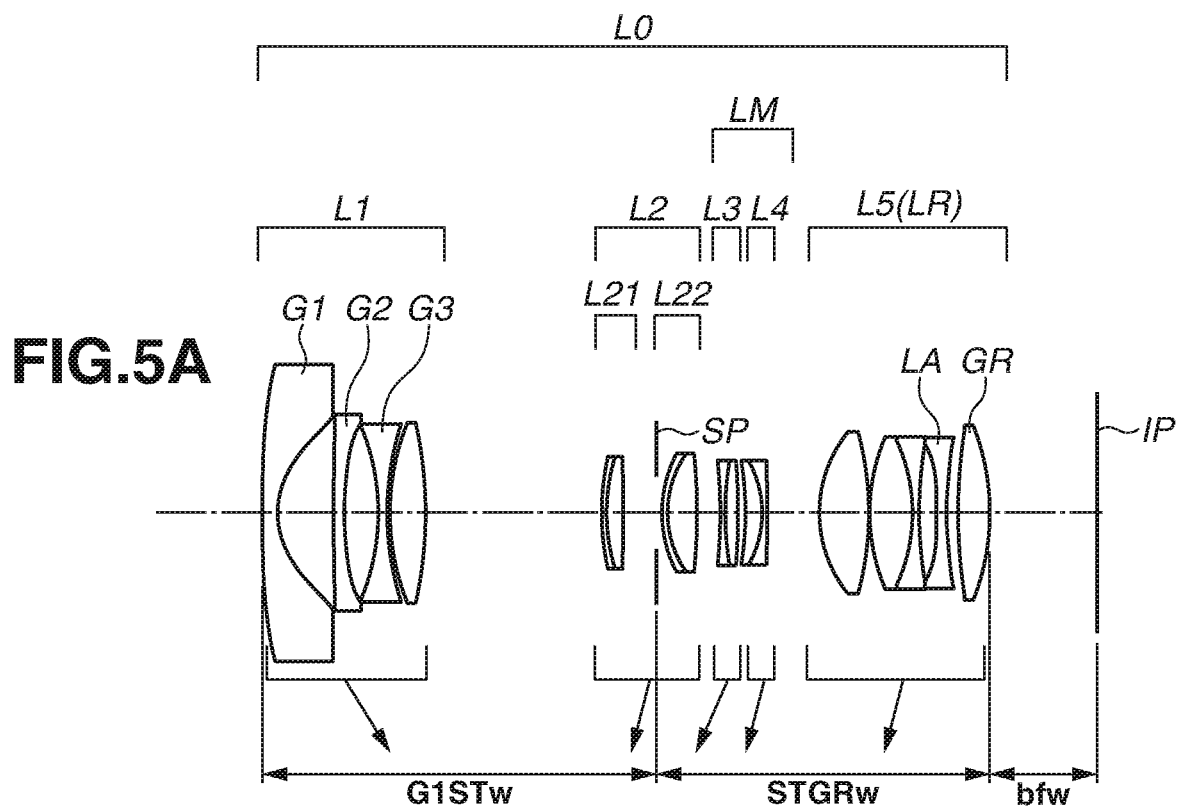
FIGS. 5A, 5B and 5C illustrate cross-sectional views of a zoom lens according to a third exemplary embodiment.
Figure 5B:
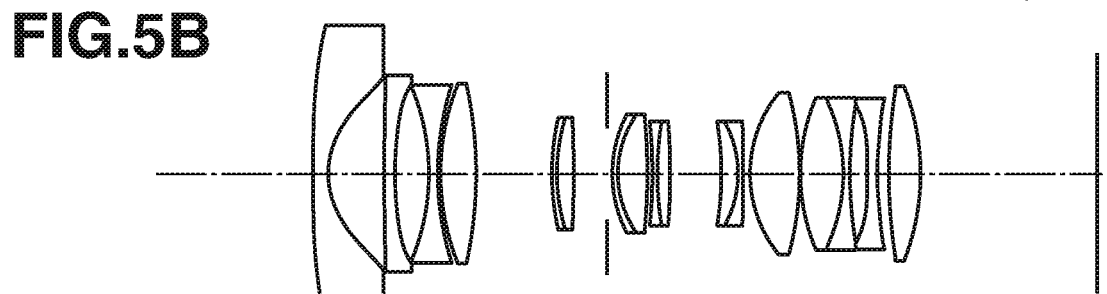
Figure 5C:
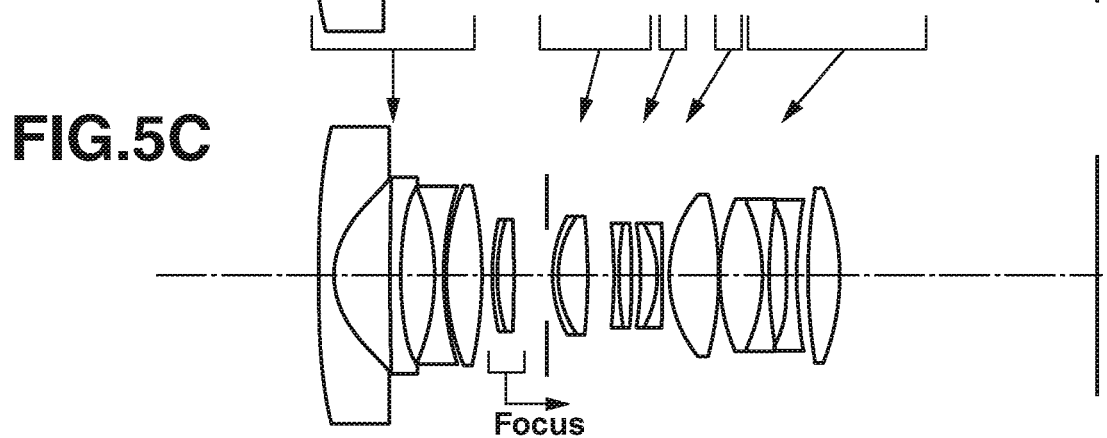
Figure 6A:
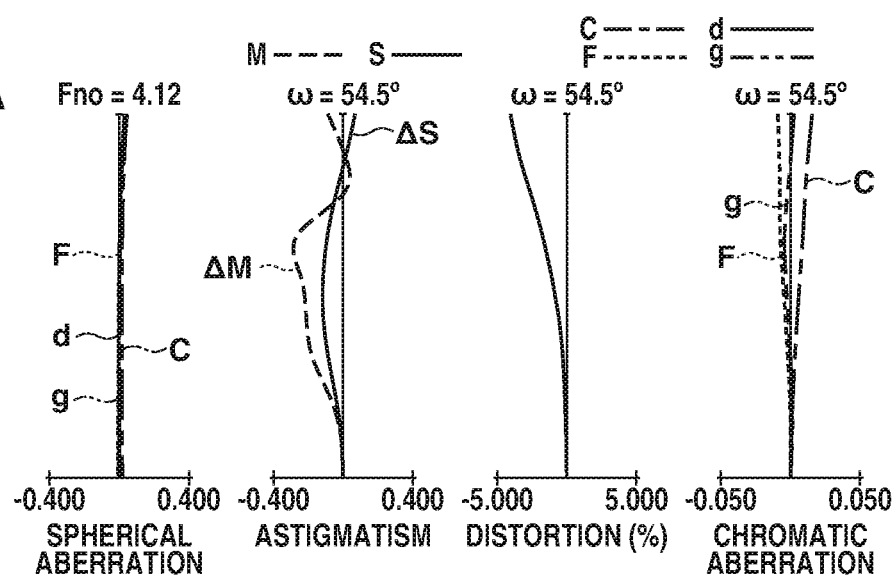
FIGS. 6A, 6B and 6C are aberration charts of the zoom lens according to the third exemplary embodiment.
Figure 6B:
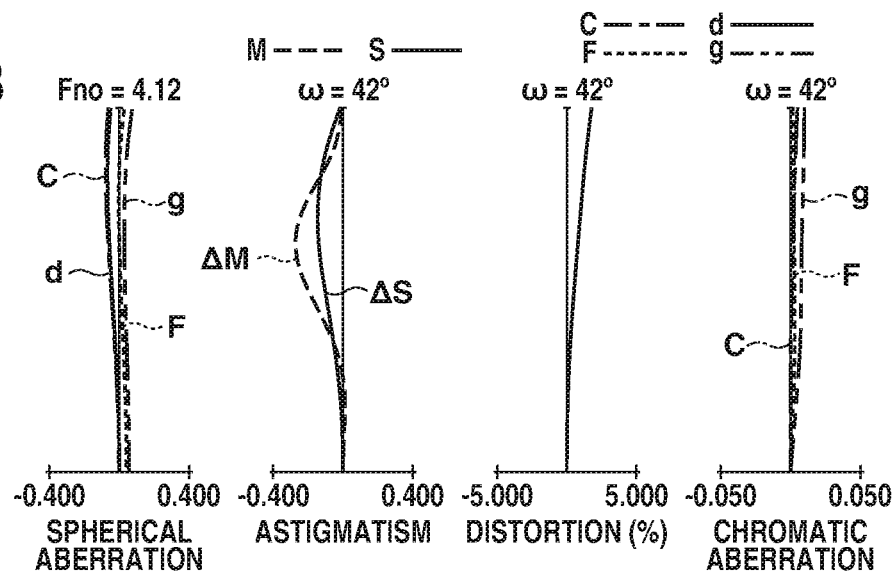
Figure 6C:
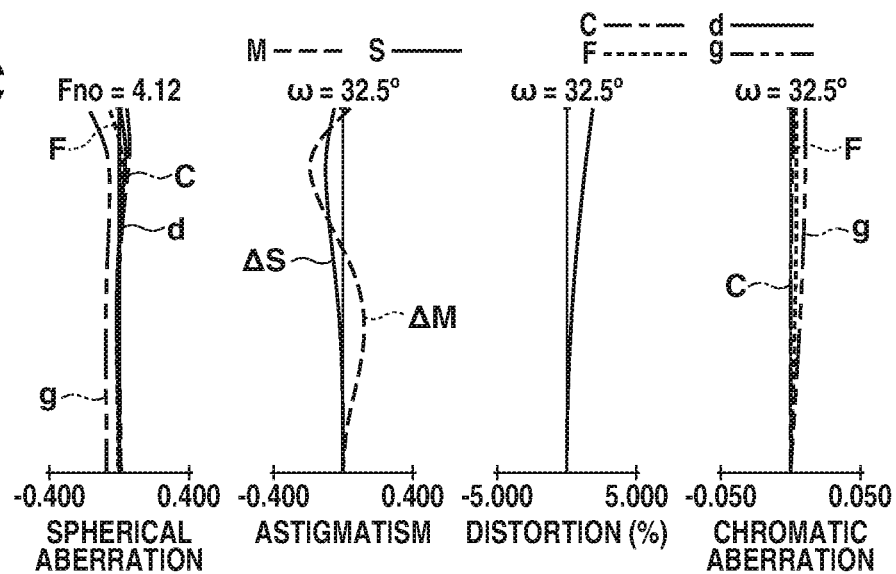

FIGS. 2A to 2C, FIGS. 4A to 4C, and FIGS. 6A to 6C illustrate aberration charts of the zoom lens L0 according to the first, the second, and the third exemplary embodiments, respectively. Each aberration chart illustrates an aberration when an object at infinity is focused. FIGS. 2A, 4A, and 6A illustrate aberration charts at the wide-angle end. FIGS. 2B, 4B, and 6B illustrate aberration charts at an intermediate zoom position. FIGS. 2C, 4C, and 6C illustrate aberration charts at the telephoto end.

Referring to each aberration chart, "Fno" represents an F number, and "ω" represents a half angle of view, i.e., an angle of view obtained by a paraxial calculation. Referring to each spherical aberration chart, "d" represents a d-line (e.g., wavelength of 587.56 nm), "g" represents a g-line (e.g., wavelength of 435.835 nm), "C" represents a C-line (e.g., wavelength of 656.27 nm), and "F" represents an F-line (e.g., wavelength of 486.13 nm).

Referring to each astigmatism chart, ΔS is a d-line on a sagittal image plane, and ΔM is a d-line on a meridional image plane. Each distortion chart illustrates a d-line. Each chromatic aberration chart represents an amount of lateral chromatic aberration with respect to a d-line.

Next, features of the zoom lens L0 according to each exemplary embodiment will be described.

In a case where the zoom lens L0 includes the first lens unit L1 having negative refractive power, the second lens unit L2 having positive refractive power, and the final lens unit LR having positive refractive power, there is a tendency that the lateral chromatic aberration and the axial chromatic aberration with respect to a g-line occur on an excessive side over an entire zooming range.

Thus, a positive lens included in the final lens unit LR includes a material having an anomalous partial dispersibility. This enables the lateral chromatic and the axial chromatic aberrations to be corrected.

According to the paraxial theory, the amount of lateral chromatic aberration occurring on each lens surface is proportional to the product of an incidence height of a paraxial marginal ray and an incidence height of a paraxial chief ray on the lens surface. The amount of axial chromatic aberration occurring on each lens surface is proportional to the square of the incidence height of the paraxial marginal ray on the lens surface. In other words, to effectively obtain the effect of the chromatic aberration correction by the positive lens included in the final lens unit LR, the positive lens is disposed at a position where the incidence height of the paraxial marginal ray and the incidence height of the paraxial chief ray are high. The paraxial marginal ray refers to a paraxial ray incident from a position where a height from the optical axis is 1 in parallel with the optical axis of the optical system in a case where the focal length of the entire optical system is normalized to 1. The paraxial chief ray refers to a paraxial ray that passes through an intersection between an entrance pupil of the optical system and the optical axis, the paraxial ray being incident at −45 degrees with respect to the optical axis in a case where the focal length of the entire optical system is normalized to 1.

In the zoom lens L0 according to each exemplary embodiment, the positive lens GR formed of a material having the anomalous partial dispersibility is disposed closest to the image side in the final lens unit LR, and the back focus of the zoom lens is adjusted to an appropriate length. More specifically, the zoom lens L0 according to each exemplary embodiment satisfies the following inequalities (1), (2) and (3):

$$0.000 < \theta gFGR - (-1.665*10^{-7}*vdGR^3 + 5.213* 10^{-5}*vdGR^2 - 5.656*10^{-3}*vdGR + 0.7278) < 0.100, \quad (1)$$

$$0.50 < bfw/fw < 1.50, \text{ and} \quad (2)$$

$$-1.00 < fw/f1 < -0.55, \quad (3)$$

where vdGR is an Abbe number of the positive lens GR, and θgFGR is a partial dispersion ratio of the positive lens GR. Further, bfw is a distance (a back focus at the wide-angle end) on the optical axis from the image side surface of the positive lens GR at the wide-angle end to the image plane, fw is a focal length of the zoom lens L0 at the wide-angle end, and f1 is a focal length of the first lens unit L1.

In a case where a parallel plate substantially having no refractive power, such as a low-pass filter or infrared cut filter, is disposed between a lens of the optical system disposed closest to the image side and the image plane, bfw is a value of an equivalent air length for these optical members.

An Abbe number (vd) and a partial dispersion ratio (θgF) of the medium according to the exemplary embodiments are defined by following equalities:

$$vd = (nd-1)/(nF-nC), \text{ and}$$

$$\theta gF = (ng-nF)/(nF-nC),$$

where ng, nd, nF, and nC are refractive indices of medium with respect to g-line, F-line, d-line, and C-line, respectively.

The inequality (1) relates to the anomalous partial dispersibility of the material of the positive lens GR included in the final lens unit LR.

In a case where the anomalous partial dispersibility of the material is low enough to reduce a value of the inequality (1) to a value lower than the lower limit of the inequality (1), it becomes difficult to favorably correct the lateral chromatic and the axial chromatic aberrations. On the other hand, in a case where the anomalous partial dispersibility of the material is high enough to increase a value of the inequality (1) higher than an upper limit of the inequality (1), the lateral chromatic and the axial chromatic aberrations are unfavorably excessively corrected.

The inequality (2) relates to the back focus of the zoom lens L0 at the wide-angle end.

In a case where a value of the inequality (2) is lower than the lower limit of the condition expression (2), an incidence height of the paraxial marginal ray in the positive lens GR at the wide-angle end excessively decreases, and thus it becomes difficult to correct the lateral chromatic and the axial chromatic aberrations. On the other hand, in a case where a value of the inequality (2) is higher than the upper limit of the inequality (2), a distance of the back focus at the wide-angle end excessively increases, and thereby increasing the size of the zoom lens L0.

The inequality (3) relates to the focal length of the first lens unit L1. In a case where a value of the inequality (3) is lower than the lower limit of the inequality (3), a negative refractive power of the first lens unit L1 excessively increases, and thus off-axis aberrations, such as a coma aberration and an astigmatism, occurring in the first lens unit L1 increase. On the other hand, in a case where a value of the inequality (3) is higher than the upper limit of inequality (3), the negative refractive power of the first lens unit L1 excessively decreases, and thus the refractive power of the lens units disposed closer to the image side is greater than the refractive power of the first lens unit L1. In this case, aberrations occurring in the lens units disposed closer to the image side increase more than those in the first lens unit L1, and thereby making it difficult to correct aberrations such as the spherical aberrations.

The above-described configuration makes it possible to obtain a downsized zoom lens having favorably corrected chromatic and other aberrations.

In one embodiment, the numerical ranges of inequalities (1), (2), and (3) are set to the numerical ranges represented by the following inequalities (1a), (2a), and (3a), respectively:

$$0.002 < \theta gFGR - (-1.665*10^{-7}*vdGR^3 + 5.213* 10^{-5}*vdGR^2 - 5.656*10^{-3}*vdGR + 0.7278) < 0.050, \quad (1a)$$

$$0.50 < bfw/fw < 1.40, \text{ and} \quad (2a)$$

$$-0.95 < fw/f1 < -0.60. \quad (3a)$$

In another embodiment, the numerical ranges of inequality (1a), (2a), and (3a) are set to the numerical ranges represented by the following inequalities (1b), (2b), and (3b), respectively:

$$0.004 < \theta gFGR - (-1.665*10^{-7}*vdGR^3 + 5.213* 10^{-5}*vdGR^2 - 5.656*10^{-3}*vdGR + 0.7278) < 0.030, \quad (1b)$$

$$0.60 < bfw/fw < 1.30, \text{ and} \quad (2b)$$

$$-0.90 < fw/f1 < -0.65. \quad (3b)$$

In one embodiment, the zoom lens L0 according to each exemplary embodiment satisfies one or more of the following inequalities (4) to (9):

$$-0.90 < bfw/ft < -0.40, \quad (4)$$

$$0.20 < fw/fR < 0.45, \quad (5)$$

$$-0.50<(GRR1+GRR2)/(GRR1-GRR2)<1.50, \quad (6)$$

$$0.80<G1STw/STGRw<1.20, \quad (7)$$

$$1.55<ndGR<1.76, \text{ and} \quad (8)$$

$$25.0<vdGR<45.0, \quad (9)$$

where fR is a focal length of the final lens unit LR, GRR1 is a curvature radius of the object side lens surface of the positive lens GR. Further, GRR2 is a curvature radius of the image side lens surface of the positive lens GR, and G1STw is a distance on the optical axis from the lens surface of the first lens unit L1 disposed closest to the object side to the aperture diaphragm SP when an object is focused at infinity at the wide-angle end. Further, STGRw is a distance on the optical axis from the aperture diaphragm SP to the image side lens surface of the positive lens GR when an object is focused at infinity at the wide-angle end, and ndGR is a refractive index with respect to the d-line of the positive lens GR.

The inequality (4) relates to a ratio of the back focus at the wide-angle end to the focal length of the first lens unit L1. In a case where a value of the inequality (4) is lower than the lower limit of the inequality (4), a negative refractive power of the first lens unit L1 excessively increases, off-axis aberrations, such as a coma aberration and an astigmatism, occurring in the first lens unit L1, and thus making it difficult to sufficiently correct these aberrations. On the other hand, in a case where a value of the inequality (4) is higher than the upper limit of the inequality (4), the refractive power of the first lens unit L1 decreases, and thus the refractive power of the lens units disposed closer to the image side is greater than the refractive power of the first lens unit L1. Accordingly, aberrations occurring in the lens units disposed closer to the image side increase more than those occurring in the first lens unit L1, and thereby making it difficult to sufficiently correct aberrations such as the spherical aberrations.

The inequality (5) relates to a ratio of the focal length of the zoom lens at the wide-angle end to the focal length of the final lens unit LR. In a case where a value of the inequality (5) is lower than the lower limit of the inequality (5), the refractive power of the final lens unit LR decreases, and thus the incidence angle of the off-axis ray with respect to the image plane. This is not preferable because shading or the like may occur due to oblique incidence light characteristics of the image sensor. On the other hand, in a case where the refractive power of the final lens unit LR is low enough to increase a value of the inequality (5) to a value higher than the upper limit of the inequality (5), it unfavorably becomes difficult to correct off-axis aberrations such as a coma aberration and an astigmatism.

The inequality (6) relates to a shape of the positive lens GR. In a case where a value of the inequality (6) is lower than the lower limit of the inequality (6), the positive lens GR provides a convex meniscus shape toward the object side. In this case, aberrations such as a coma aberration and an astigmatism increase, and thus making it difficult to obtain sufficiently favorable optical performance. On the other hand, in a case where a value of the inequality (6) is higher than the upper limit of the inequality (6), the positive lens GR provides a convex meniscus shape toward the image side because of the positive refractive power of the positive lens GR. Thus, an incidence angle of the off-axis ray with respect to the image plane is likely to increase, and the zoom lens is affected by the oblique incidence light characteristics of the image sensor, unfavorably causing shading.

The inequality (7) relates to a position of the aperture diaphragm SP. In a case where a value of the inequality (7) is lower than the lower limit of the inequality (7) or higher than the upper limit of the inequality (7), a distance from the aperture diaphragm SP to a lens surface closest to the object (an object-side lens surface of a lens closest to the object, the lens being included in the first lens unit L1) or a distance from the aperture diaphragm SP to a lens surface closest to the image (an image-side lens surface of the positive lens GR) becomes too short, and thus making it difficult to favorably correct off-axis aberrations such as a coma aberration and a distortion.

The inequality (8) relates to a refractive index of the positive lens GR.

A zoom lens having a relatively wide angle of view is provided with a plurality of negative lenses with high refractive power. Thus, a Petzval sum for an entire zoom lens tends to become negative. Accordingly, a material having a low refractive index for positive lenses is used.

In a case where a refractive index of the positive lens GR is great enough to increase a value of the inequality (8) to a value higher than the upper limit of the inequality (8), a Petzval sum excessively decreases, and thereby unfavorably making it difficult to correct the field curvature. On the other hand, in a case where a refractive index of the positive lens GR is small enough to decrease a value of the inequality (8) to a value lower than the lower limit of inequality (8), the lens curvature to obtain suitable refractive power increases (from the viewpoint of a Petzval sum), making it difficult to correct off-axis aberrations, such as a coma aberration.

The inequality (9) relates to an Abbe number of the positive lens GR.

In a case where a value of the inequality (9) is higher than the upper limit of the inequality (9), the lateral chromatic and the axial chromatic aberrations are excessively corrected. On the other hand, in a case where a value of the inequality (9) is lower than the lower limit of the inequality (9), the lateral chromatic and the axial chromatic aberrations are insufficiently corrected.

In one embodiment, the numerical ranges of inequalities (4) to (9) are set to the numerical ranges represented by the following inequalities (4a) to (9a), respectively:

$$-0.87<bfw/fl<-0.50, \quad (4a)$$

$$0.23<fw/fR<0.43, \quad (5a)$$

$$-0.49<(GRR1+GRR2)/(GRR1-GRR2)<1.40, \quad (6a)$$

$$0.85<G1STw/STGRw<1.19, \quad (7a)$$

$$1.57<ndGR<1.70, \text{ and} \quad (8a)$$

$$30.0<vdGR<42.0. \quad (9a)$$

In another embodiment, the numerical ranges of inequalities (4a) to (9a) are set to the numerical ranges represented by the following inequalities (4b) to (9b), respectively:

$$-0.85<bfw/fl<-0.60, \quad (4b)$$

$$0.25<fw/fR<0.40, \quad (5b)$$

$$-0.48<(GRR1+GRR2)/(GRR1-GRR2)<1.30, \quad (6b)$$

$$0.90<G1STw/STGRw<1.10, \quad (7b)$$

$$1.59<ndGR<1.65, \text{ and} \quad (8b)$$

$$35.0<vdGR<40.0. \quad (9b)$$

During zooming from the wide-angle end to the telephoto end, the first lens unit L1 and the second lens unit L2 are moved. This enables downsizing the zoom lens L0 particularly at the wide-angle end.

At least one of the negative lens G1 and the negative lens G2 has an aspherical shape on at least one of the object side and the image side surfaces. This makes it easier to correct the distortion and the astigmatism at the wide-angle end.

Further, out of the lenses having negative refractive power included in the final lens unit LR, at least one of the object side and the image side surfaces of the negative lens LA disposed closest to the image side has an aspherical shape. This makes it easier to correct the field curvature and the distortion at the wide-angle end.

In one embodiment, focusing from an object at infinity to an object at a close distance is performed by moving at least a part of the second lens unit L2 from the object side to the image side. This makes it easier to prevent variations in the field curvature and the spherical aberration when the object distance varies.

In the embodiment, the negative lenses G1 to G3 are consecutively disposed. More specifically, the negative lens G2 is disposed adjacent to the image side of the negative lens G1, and the negative lens G3 is disposed adjacent to the image side of the negative lens G2. This enables effectively achieving a good balance between downsizing and increasing in angle of view of the zoom lens.

Next, a first, second and third numerical exemplary embodiments respectively corresponding to the first, second and third exemplary embodiments will be described. In each numerical exemplary embodiment, "surface number" denotes an order of an optical surface counted from the object side, "r" denotes a curvature radius of an i-th optical surface (also referred to as an i-th surface, where i is a natural number) counted from the object side, "d" denotes an interval between the i-th surface and an (i+1)-th surface. Further, "nd", "vd", "θgF", and "effective diameter" denote a refractive index, an Abbe number, a partial dispersion ratio, and an effective diameter, respectively, of an optical member. The effective diameter refers to a lens diameter determined by passage ranges of on-axis and off-axis rays.

"Entrance pupil position" refers to a distance from a lens surface closest to the object side (first surface) to an entrance pupil. "Exit pupil position" refers to a distance from a lens surface closest to the image side (final lens surface) to an exit pupil. "Front principal point position" refers to a distance from a first lens surface to a front principal point. "Rear principal point position" refers to a distance from a final lens surface to a rear principal point. Each numerical value denotes a paraxial quantity, and a positive sign denotes the direction from the object side to the image side.

In each numerical exemplary embodiment, an aspherical surface is supplied with an asterisk (*). An aspherical shape is represented by the following expression: $x=(h^2/R)/[1+[1-(1+k)(h/R)^2]^{1/2}]A4h^4+A6h^6+A8h^8+A10h^{10}+\ldots$, where k is a conic constant, A4, A6, A8, and A10 are aspherical coefficients, x is a displacement of a surface position in an optical axis direction at a position of height h from the optical axis (with respect to a surface apex), and R is a paraxial curvature radius.

An expression of "e-Z" means "$10^{-Z}$".

According to each exemplary embodiment, a back focus (BF) represents a distance from the final lens surface to the paraxial image plane in an equivalent air length. A total lens length refers to a distance from the lens surface closest to the object side to the final lens surface plus the back focus.

[First Numerical Exemplary Embodiment]
Unit mm

Surface Data

| Surface Number | r | d | nd | vd | θgF | Effective Diameter |
|---|---|---|---|---|---|---|
| 1* | 9923.241 | 2.70 | 1.58313 | 59.4 | 0.5423 | 50.96 |
| 2* | 14.703 | 10.60 | | | | 33.45 |
| 3* | 899.997 | 1.90 | 1.85400 | 40.4 | 0.5688 | 32.75 |
| 4* | 122.957 | 3.65 | | | | 30.44 |
| 5 | −61.732 | 1.60 | 1.59522 | 67.7 | 0.5442 | 30.21 |
| 6 | 26.366 | 0.95 | | | | 28.63 |
| 7 | 28.730 | 6.40 | 1.73800 | 32.3 | 0.5899 | 28.93 |
| 8 | −208.248 | (variable) | | | | 28.46 |
| 9 | 30.242 | 0.90 | 2.05090 | 26.9 | 0.6054 | 18.70 |
| 10 | 20.499 | 4.50 | 1.57501 | 41.5 | 0.5767 | 18.48 |
| 11 | −147.123 | (variable) | | | | 18.73 |
| 12 (Diaphragm) | ∞ | 2.15 | | | | 19.51 |
| 13 | 21.839 | 1.00 | 2.00069 | 25.5 | 0.6133 | 20.07 |
| 14 | 15.836 | 6.10 | 1.49700 | 81.5 | 0.5375 | 19.26 |
| 15 | −108.465 | (variable) | | | | 19.00 |
| 16 | −71.432 | 0.85 | 2.05090 | 26.9 | 0.6054 | 16.27 |
| 17 | 42.033 | 0.40 | | | | 16.26 |
| 18 | 38.196 | 5.20 | 1.84666 | 23.8 | 0.6205 | 16.47 |
| 19 | −17.398 | 0.85 | 1.80610 | 33.3 | 0.5881 | 16.51 |
| 20 | 266.087 | (variable) | | | | 16.49 |
| 21 | 24.975 | 8.30 | 1.43875 | 94.7 | 0.5340 | 25.25 |
| 22 | −35.552 | 0.15 | | | | 25.44 |
| 23 | 40.988 | 9.50 | 1.49700 | 81.5 | 0.5375 | 24.42 |
| 24 | −18.411 | 1.20 | 1.88300 | 40.8 | 0.5652 | 23.14 |
| 25 | 66.884 | 3.20 | | | | 23.57 |
| 26* | −156.589 | 1.80 | 1.85400 | 40.4 | 0.5688 | 23.70 |
| 27* | 377.843 | 3.80 | | | | 25.51 |
| 28 | 75.939 | 4.20 | 1.59270 | 35.3 | 0.5933 | 32.72 |
| 29 | −207.444 | (variable) | | | | 33.50 |
| Image Plane | ∞ | | | | | |

-continued

[First Numerical Exemplary Embodiment]
Unit mm

Aspherical data

First surface

K = 0.00000e+000
A 4 = 1.83855e−005
A 6 = −5.01300e−008
A 8 = 7.96652e−011
A10 = −6.23025e−014
A12 = 1.88081e−017
A14 = 8.47333e−022

Second surface

K = −1.00000e+000
A 4 = 1.58736e−005
A 6 = 4.32530e−009
A 8 = 5.00119e−010
A10 = −6.12663e−012
A12 = 2.22194e−014
A14 = −2.94801e−017

Third surface

K = 0.00000e+000
A 4 = −2.02409e−005
A 6 = 2.21527e−007
A 8 = −1.14895e−009
A10 = 2.87698e−012
A12 = −2.80040e−015

Fourth surface

K = 0.00000e+000
A 4 = −9.28680e−006
A 6 = 1.89232e−007
A 8 = −9.19105e−010
A10 = 2.32146e−012
A12 = −1.67719e−015

26th surface

K = 0.00000e+000
A 4 = −1.12632e−004
A 6 = 1.86080e−007
A 8 = 9.66878e−010
A10 = −1.64761e−012

27th surface

K = 0.00000e+000
A 4 = −8.52410e−005
A 6 = 2.88773e−007
A 8 = 4.64570e−010
A10 = −1.74093e−012

Various Data
Zoom ratio 2.20

|  | Wide Angle | Intermediate | Telephoto |
| --- | --- | --- | --- |
| Focal Length | 15.45 | 24.00 | 33.95 |
| F Number | 4.12 | 4.12 | 4.12 |
| Half Angle of Field (°) | 54.47 | 42.03 | 32.51 |
| Image Height | 21.64 | 21.64 | 21.64 |
| Total Lens Length | 142.07 | 135.07 | 138.26 |
| BF | 14.80 | 23.82 | 35.39 |
| d 8 | 26.41 | 10.39 | 2.70 |
| d11 | 6.74 | 6.74 | 6.05 |
| d15 | 1.24 | 6.84 | 10.82 |
| d20 | 10.98 | 5.38 | 1.40 |
| d29 | 14.80 | 23.82 | 35.39 |
| Entrance Pupil Position | 17.80 | 16.47 | 15.43 |
| Exit Pupil Position | −50.26 | −47.16 | −44.49 |
| Front Principal Point Position | 29.58 | 32.36 | 34.95 |
| Rear Principal Point Position | −0.65 | −0.18 | 1.44 |

-continued

[First Numerical Exemplary Embodiment]
Unit mm

Zoom Lens Unit Data

| Unit | Starting Surface | Focal Length | Lens Structure Length | Front Principal Point Position | Rear Principal Point Position |
|---|---|---|---|---|---|
| 1 | 1 | −20.30 | 27.80 | 2.72 | −20.40 |
| 2 | 9 | 64.09 | 5.40 | 0.18 | −3.15 |
| 3 | 12 | 52.79 | 9.25 | 2.43 | −4.38 |
| 4 | 16 | −55.62 | 7.30 | −0.21 | −4.31 |
| 5 | 21 | 53.71 | 32.15 | −7.02 | −29.01 |

Single Lens Data

| Lens | Starting Surface | Focal Length |
|---|---|---|
| 1 | 1 | −25.25 |
| 2 | 3 | −166.95 |
| 3 | 5 | −30.83 |
| 4 | 7 | 34.61 |
| 5 | 9 | −63.55 |
| 6 | 10 | 31.60 |
| 7 | 13 | −62.80 |
| 8 | 14 | 28.26 |
| 9 | 16 | −25.08 |
| 10 | 18 | 14.75 |
| 11 | 19 | −20.23 |
| 12 | 21 | 34.89 |
| 13 | 23 | 27.00 |
| 14 | 24 | −16.24 |
| 15 | 26 | −129.43 |
| 16 | 28 | 94.31 |

[Second Numerical Exemplary Embodiment]
Unit mm

Surface Data

| Surface Number | r | d | nd | vd | θgF | Effective Diameter |
|---|---|---|---|---|---|---|
| 1* | 105.360 | 2.70 | 1.58313 | 59.4 | 0.5423 | 45.69 |
| 2* | 12.588 | 9.10 | | | | 30.77 |
| 3* | 900.000 | 1.90 | 1.85400 | 40.4 | 0.5688 | 30.15 |
| 4* | 353.481 | 4.50 | | | | 27.60 |
| 5 | −32.580 | 1.60 | 1.53775 | 74.7 | 0.5392 | 26.98 |
| 6 | 23.969 | 1.00 | | | | 25.34 |
| 7 | 26.882 | 5.50 | 1.72047 | 34.7 | 0.5834 | 25.58 |
| 8 | −298.569 | (variable) | | | | 25.10 |
| 9 | 27.007 | 0.90 | 2.05090 | 26.9 | 0.6054 | 18.27 |
| 10 | 18.371 | 4.90 | 1.57501 | 41.5 | 0.5767 | 18.01 |
| 11 | −120.739 | 6.94 | | | | 18.30 |
| 12 (Diaphragm) | ∞ | 1.00 | | | | 19.18 |
| 13 | 22.071 | 1.00 | 2.00069 | 25.5 | 0.6133 | 19.58 |
| 14 | 15.606 | 6.10 | 1.49700 | 81.5 | 0.5375 | 18.79 |
| 15 | −102.827 | (variable) | | | | 18.57 |
| 16 | −74.871 | 0.90 | 2.05090 | 26.9 | 0.6054 | 16.68 |
| 17 | 100.908 | 0.50 | | | | 16.69 |
| 18 | 51.736 | 4.80 | 1.84666 | 23.8 | 0.6205 | 16.85 |
| 19 | −18.675 | 0.90 | 1.80610 | 33.3 | 0.5881 | 16.75 |
| 20 | 66.396 | (variable) | | | | 16.50 |
| 21 | 24.874 | 8.40 | 1.49700 | 81.5 | 0.5375 | 26.10 |
| 22 | −39.695 | 0.15 | | | | 26.17 |
| 23 | 44.117 | 8.40 | 1.49700 | 81.5 | 0.5375 | 24.85 |
| 24 | −21.046 | 1.20 | 1.88300 | 40.8 | 0.5652 | 23.65 |
| 25 | 169.449 | 2.35 | | | | 23.57 |
| 26* | 438.588 | 1.80 | 1.85400 | 40.4 | 0.5688 | 23.59 |
| 27* | 50.582 | 9.10 | | | | 25.25 |
| 28 | −540.845 | 3.90 | 1.60342 | 38.0 | 0.5835 | 34.02 |
| 29 | −60.381 | (variable) | | | | 35.00 |
| Image Plane | ∞ | | | | | |

-continued

[Second Numerical Exemplary Embodiment]
Unit mm

Aspherical Data

First surface

K = 0.00000e+000
A 4 = −1.32359e−005
A 6 = 1.46316e−007
A 8 = −5.64690e−010
A10 = 1.09573e−012
A12 = −1.05221e−015
A14 = 4.09550e−019

Second surface

K = −1.00000e+000
A 4 = −1.12664e−005
A 6 = 1.61657e−007
A 8 = −4.35914e−010
A10 = 1.02218e−011
A12 = −8.87102e−014
A14 = 1.76028e−016

Third surface

K = 0.00000e+000
A 4 = −1.52871e−006
A 6 = −5.40224e−008
A 8 = 5.97801e−010
A10 = −2.50712e−012
A12 = 4.03540e−015

Fourth surface

K = 0.00000e+000
A 4 = 8.88405e−006
A 6 = −2.60726e−008
A 8 = 1.08975e−010
A10 = 1.68919e−012
A12 = −6.74769e−016

26th surface

K = 0.00000e+000
A 4 = −1.62439e−004
A 6 = 6.07220e−007
A 8 = −6.82615e−010
A10 = −1.08552e−012

27th surface

K = 0.00000e+000
A 4 = −1.35328e−004
A 6 = 7.80822e−007
A 8 = −1.79569e−009
A10 = 1.61333e−012

Various Data
Zoom ratio 2.06

|  | Wide Angle | Intermediate | Telephoto |
| --- | --- | --- | --- |
| Focal Length | 16.48 | 24.00 | 33.95 |
| F Number | 4.12 | 4.12 | 4.12 |
| Half Angle of Field (°) | 52.70 | 42.03 | 32.51 |
| Image Height | 21.64 | 21.64 | 21.64 |
| Total Lens Length | 132.09 | 128.84 | 134.21 |
| BF | 10.35 | 19.54 | 33.20 |
| d 8 | 19.85 | 8.58 | 2.01 |
| d15 | 1.18 | 5.79 | 8.47 |
| d20 | 11.17 | 5.40 | 1.00 |
| d29 | 10.35 | 19.54 | 33.20 |
| Entrance Pupil Position | 17.22 | 16.24 | 15.48 |
| Exit Pupil Position | −59.09 | −53.31 | −48.03 |
| Front Principal Point Position | 29.79 | 32.34 | 35.24 |
| Rear Principal Point Position | −6.13 | −4.46 | −0.75 |

[Second Numerical Exemplary Embodiment]
Unit mm

Zoom Lens Unit Data

| Unit | Starting Surface | Focal Length | Lens Structure Length | Front Principal Point Position | Rear Principal Point Position |
|---|---|---|---|---|---|
| 1 | 1 | −18.56 | 26.30 | 3.66 | −17.70 |
| 2 | 9 | 30.87 | 20.84 | 6.83 | −10.73 |
| 3 | 16 | −54.83 | 7.10 | 1.65 | −2.28 |
| 4 | 21 | 48.41 | 35.30 | −3.34 | −31.69 |

Single Lens Data

| Lens | Starting Surface | Focal Length |
|---|---|---|
| 1 | 1 | −24.78 |
| 2 | 3 | −682.72 |
| 3 | 5 | −25.43 |
| 4 | 7 | 34.47 |
| 5 | 9 | −57.75 |
| 6 | 10 | 28.09 |
| 7 | 13 | −57.70 |
| 8 | 14 | 27.74 |
| 9 | 16 | −40.79 |
| 10 | 18 | 16.73 |
| 11 | 19 | −18.00 |
| 12 | 21 | 32.16 |
| 13 | 23 | 29.95 |
| 14 | 24 | −21.14 |
| 15 | 26 | −67.09 |
| 16 | 28 | 112.30 |

[Third Numerical Exemplary Embodiment]
Unit mm

Surface Data

| Surface Number | r | d | nd | vd | θgF | Effective Diameter |
|---|---|---|---|---|---|---|
| 1* | 8881.910 | 2.70 | 1.58313 | 59.4 | 0.5423 | 52.06 |
| 2* | 14.633 | 10.00 | | | | 34.63 |
| 3* | 119.173 | 2.00 | 1.85400 | 40.4 | 0.5688 | 34.04 |
| 4* | 55.322 | 6.10 | | | | 30.84 |
| 5 | −40.539 | 1.60 | 1.53775 | 74.7 | 0.5392 | 30.59 |
| 6 | 52.474 | 0.50 | | | | 30.72 |
| 7 | 43.557 | 6.40 | 1.72047 | 34.7 | 0.5834 | 31.13 |
| 8 | −74.847 | (variable) | | | | 30.91 |
| 9 | 45.567 | 0.90 | 2.05090 | 26.9 | 0.6054 | 18.83 |
| 10 | 34.603 | 3.00 | 1.57501 | 41.5 | 0.5767 | 18.77 |
| 11 | −233.780 | 5.95 | | | | 18.94 |
| 12 (Diaphragm) | ∞ | 1.00 | | | | 19.71 |
| 13 | 23.075 | 1.00 | 2.00069 | 25.5 | 0.6133 | 20.12 |
| 14 | 18.608 | 5.30 | 1.49700 | 81.5 | 0.5375 | 19.52 |
| 15 | −104.424 | (variable) | | | | 19.20 |
| 16 | −92.808 | 0.90 | 1.90043 | 37.4 | 0.5766 | 17.64 |
| 17 | 58.221 | 2.30 | 1.64769 | 33.8 | 0.5938 | 17.48 |
| 18 | −117.213 | (variable) | | | | 17.42 |
| 19 | −57.540 | 3.00 | 1.84666 | 23.8 | 0.6205 | 17.21 |
| 20 | −19.179 | 0.90 | 1.95375 | 32.3 | 0.5898 | 17.29 |
| 21 | −402.000 | (variable) | | | | 17.57 |
| 22 | 23.177 | 8.90 | 1.49700 | 81.5 | 0.5375 | 27.82 |
| 23 | −55.505 | 0.15 | | | | 27.68 |
| 24 | 34.946 | 7.70 | 1.49700 | 81.5 | 0.5375 | 26.11 |
| 25 | −31.010 | 1.20 | 1.88300 | 40.8 | 0.5652 | 24.82 |
| 26 | 75.185 | 3.10 | | | | 23.92 |
| 27* | 573.429 | 1.80 | 1.85400 | 40.4 | 0.5688 | 23.90 |
| 28* | 38.442 | 2.10 | | | | 25.89 |
| 29 | 96.682 | 5.70 | 1.59551 | 39.2 | 0.5803 | 28.94 |
| 30 | −42.957 | (variable) | | | | 30.17 |
| Image plane | ∞ | | | | | |

[Third Numerical Exemplary Embodiment]
Unit mm

Aspherical data

First surface

K = 0.00000e+000
A 4 = 1.14504e-005
A 6 = -2.12730e-008
A 8 = 2.48071e-011
A10 = -2.75711e-014
A12 = 3.55721e-017
A14 = -2.03057e-020
Second surface K = -1.00000e+000
A 4 = 5.21867e-006
A 6 = 1.37128e-008
A 8 = 4.31211e-011
A10 = 8.52116e-013
A12 = -1.13696e-014
A14 = 2.15479e-017
Third surface K = 0.00000e+000
A 4 = -4.61176e-005
A 6 = 3.18972e-007
A 8 = -1.17323e-009
A10 = 2.01382e-012
A12 = -1.08423e-015
Fourth surface K = 0.00000e+000
A 4 = -3.47158e-005
A 6 = 3.50862e-007
A 8 = -1.52193e-009
A10 = 4.17102e-012
A12 = -3.99915e-015
27th surface K = 0.00000e+000
A 4 = -1.52167e-004
A 6 = 5.57922e-007
A 8 = -9.96814e-010
A10 = -6.24719e-013
28th surface K = 0.00000e+000
A 4 = -1.19117e-004
A 6 = 7.50662e-007
A 8 = -1.90586e-009
A10 = 1.84128e-012

Various Data
Zoom ratio 2.20

|  | Wide Angle | Intermediate | Telephoto |
| --- | --- | --- | --- |
| Focal Length | 15.45 | 24.00 | 33.95 |
| F Number | 4.12 | 4.12 | 4.12 |
| Half Angle of Field (°) | 54.47 | 42.03 | 32.51 |
| Image Height | 21.64 | 21.64 | 21.64 |
| Total Lens Length | 150.01 | 141.11 | 140.23 |
| BF | 19.25 | 31.83 | 46.78 |
| d 8 | 31.66 | 13.68 | 1.99 |
| d15 | 4.17 | 1.00 | 4.73 |
| d18 | 1.33 | 9.20 | 1.54 |
| d21 | 9.39 | 1.20 | 0.99 |
| d30 | 19.25 | 31.83 | 46.78 |
| Entrance Pupil Position | 18.32 | 16.80 | 15.33 |
| Exit Pupil Position | -66.05 | -49.48 | -42.61 |
| Front Principal Point Position | 30.97 | 33.71 | 36.38 |
| Rear Principal Point Position | 3.80 | 7.83 | 12.83 |

-continued

[Third Numerical Exemplary Embodiment]
Unit mm

Zoom Lens Unit Data

| Unit | Starting Surface | Focal Length | Lens Structure Length | Front Principal Point Position | Rear Principal Point Position |
|---|---|---|---|---|---|
| 1 | 1 | −23.54 | 29.30 | 0.91 | −25.99 |
| 2 | 9 | 32.60 | 17.15 | 6.64 | −7.54 |
| 3 | 16 | −119.00 | 3.20 | −0.99 | −2.88 |
| 4 | 19 | −55.62 | 3.90 | 0.23 | −1.85 |
| 5 | 22 | 41.39 | 30.65 | −0.31 | −23.63 |

Single Lens Data

| Lens | Starting Surface | Focal Length |
|---|---|---|
| 1 | 1 | −25.14 |
| 2 | 3 | −122.68 |
| 3 | 5 | −42.28 |
| 4 | 7 | 39.10 |
| 5 | 9 | −142.86 |
| 6 | 10 | 52.63 |
| 7 | 13 | −108.17 |
| 8 | 14 | 32.24 |
| 9 | 16 | −39.62 |
| 10 | 17 | 60.37 |
| 11 | 19 | 32.80 |
| 12 | 20 | −21.14 |
| 13 | 22 | 34.18 |
| 14 | 24 | 34.39 |
| 15 | 25 | −24.73 |
| 16 | 27 | −48.32 |
| 17 | 29 | 50.72 |

Various values according to each exemplary embodiment will be presented in the following table.

TABLE 1

| Conditional Expression | First Exemplary Embodiment | Second Exemplary Embodiment | Third Exemplary Embodiment |
|---|---|---|---|
| (1) $\Delta\theta gf$ | 0.0076 | 0.0046 | 0.0043 |
| (2) bfw/fw | 0.958 | 0.628 | 1.246 |
| (3) fw/f1 | −0.761 | −0.888 | −0.656 |
| (4) bfw/f1 | −0.729 | −0.558 | −0.818 |
| (5) fw/fR | 0.288 | 0.340 | 0.373 |
| (6) (GRR1 + GRR2)/(GRR1 − GRR2) | −0.464 | 1.251 | 0.385 |
| (7) G1STw/STGRw | 1.089 | 0.937 | 1.181 |
| (8) ndGR | 1.5927 | 1.60342 | 1.59551 |
| (9) vdGR | 35.3 | 38.0 | 39.2 |

[Imaging Apparatus]

Figure 7:
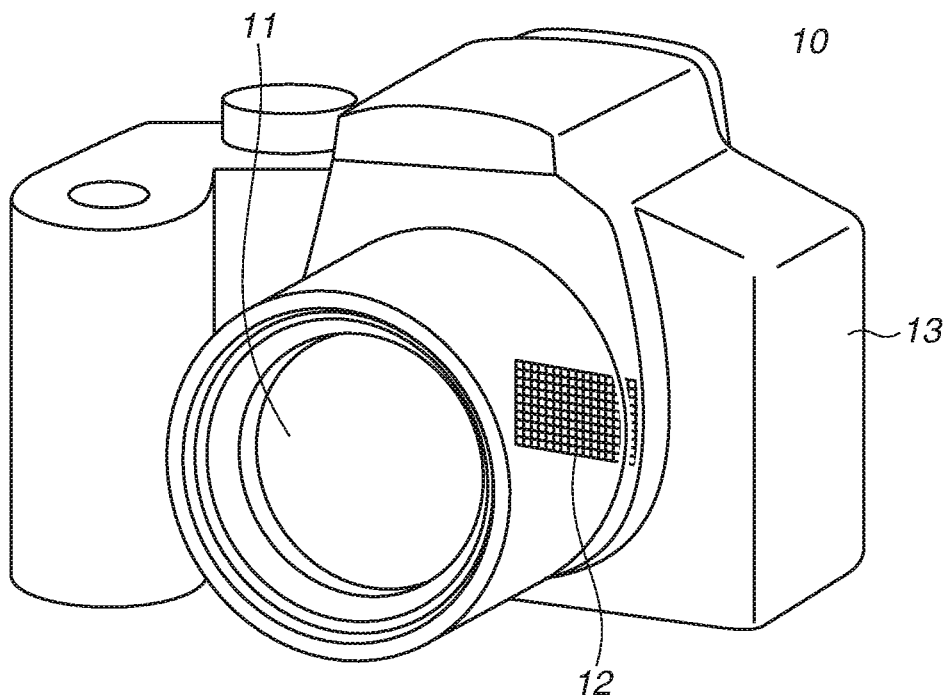
FIG. 7 illustrate a schematic view of an imaging apparatus.

Next, an imaging apparatus according to an exemplary embodiment of the disclosure will be described. FIG. 7 is a schematic view illustrating an imaging apparatus (e.g., digital still camera) 10 according to the present exemplary embodiment. The imaging apparatus 10 includes a camera body 13, a zoom lens 11 similar to the zoom lens according to one of the above-described first to third exemplary embodiments, and a light receiving element (e.g., image sensor) 12 for photoelectrically converting an optical image formed by the zoom lens 11.

The imaging apparatus 10 according to the present exemplary embodiment includes the downsized zoom lens 11 having favorably corrected chromatic and other aberrations, and thereby making it possible to capture high-definition images.

An image sensor, such as a CCD or CMOS sensor, may be used as the light receiving element 12. In this case, an image quality of an output image can be improved by electrically correcting aberrations, such as distortion and chromatic aberration, of an image captured by the light receiving element 12.

The above-described zoom lens L0 according to each exemplary embodiment is applicable not only to the digital still camera illustrated in FIG. 7 but also to silver-halide film cameras, video cameras, telescopes, and other diverse types of optical devices.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-095937, filed May 22, 2019, which is hereby incorporated by reference herein in its entirety.

What is claimed is:
1. A zoom lens comprising:
a first lens unit having negative refractive power;
a second lens unit having positive refractive power;
an intermediate unit including one or more lens units; and
a final lens unit having positive refractive power disposed closest to an image side,
the first lens unit, the second lens unit, the intermediate unit, and the final lens unit being disposed in this order from an object side to the image side,
intervals between adjacent lens units being changed during zooming, wherein the first lens unit includes a negative lens G1, a negative lens G2, and a negative lens G3 disposed in this order from the object side to the image side, wherein the final lens unit includes a negative lens LA and a positive lens GR disposed closest to the image side, and wherein the following inequalities are satisfied:

$$0.000 < \theta gFGR - (-1.665*10^{-7}*vdGR^3 + 5.213*10^{-5}*vdGR^2 - 5.656*10^{-3}*vdGR + 0.7278) < 0.100,$$

$$0.50 < bfw/fw < 1.50,$$

$$-1.00 < fw/f1 < -0.55, \text{ and}$$

$$-0.90 < bfw/f1 < -0.40,$$

where vdGR is an Abbe number of the positive lens GR, θgFGR is a partial dispersion ratio of the positive lens GR, bfw is a distance from the image side surface of the positive lens GR at a wide-angle end, fw is a focal length of the zoom lens at the wide-angle end, and f1 is a focal length of the first lens unit.

2. The zoom lens according to claim 1, wherein the first lens unit and the second lens unit move during zooming.

3. The zoom lens according to claim 1, wherein at least one of an object side lens surface of the negative lens G1 and an image side lens surface of the negative lens G1 is aspherical.

4. The zoom lens according to claim 1, wherein the following inequality is satisfied:

$$0.20 < fw/fR < 0.45,$$

where fR is a focal length of the final lens unit.

5. The zoom lens according to claim 1, wherein the following inequality is satisfied:

$$-0.50 < (GRR1 + GRR2)/(GRR1 - GRR2) < 1.50,$$

where GRR1 is a curvature radius of an object side lens surface of the positive lens GR, and GRR2 is a curvature radius of an image side lens surface of the positive lens GR.

6. The zoom lens according to claim 1, further comprising an aperture diaphragm, wherein the following inequality is satisfied:

$$0.80 < G1STw/STGRw < 1.20,$$

where G1STw is a distance from a lens surface of the first lens unit closest to the object side to the aperture diaphragm when an object at infinity is focused at the wide-angle end, and STGRw is a distance from the aperture diaphragm to the image side lens surface of the positive lens GR when an object at infinity is focused at the wide-angle end.

7. The zoom lens according to claim 1, wherein the following inequality is satisfied:

$$1.55 < ndGR < 1.76,$$

where ndGR is a refractive index of the positive lens GR.

8. The zoom lens according to claim 1, wherein the following inequality is satisfied:

$$25.0 < vdGR < 45.0.$$

9. The zoom lens according to claim 1, wherein at least one of an object side lens surface of the negative lens G2 and an image side lens surface of the negative lens G2 is aspherical.

10. The zoom lens according to claim 1, wherein at least one of an object side lens surface of the negative lens LA and an image side lens surface of the negative lens LA is aspherical, and wherein the negative lens LA is a negative lens disposed closest to the image side among at least one of negative lenses included in the final lens unit.

11. The zoom lens according to claim 1, wherein at least a part of a second lens unit moves during focusing.

12. The zoom lens according to claim 1, wherein the intermediate unit includes a third lens unit having positive refractive power and a fourth lens unit having negative refractive power disposed in this order from the object side to the image side.

13. The zoom lens according to claim 1, wherein the intermediate unit consists of a third lens unit having negative refractive power.

14. The zoom lens according to claim 1, wherein the intermediate unit includes a third lens unit having negative refractive power and a fourth lens unit having negative refractive power disposed in this order from the object side to the image side.

15. The zoom lens according to claim 1, wherein the negative lens G2 is disposed adjacent to an image side of the negative lens G1, and the negative lens G3 is disposed adjacent to an image side of the negative lens G2.

16. An imaging apparatus comprising:

a zoom lens, and an image sensor configured to photoelectrically convert an optical image formed by the zoom lens, wherein the zoom lens comprises:

a first lens unit having negative refractive power;

a second lens unit having positive refractive power;

an intermediate unit including one or more lens units; and a final lens unit having positive refractive power disposed closest to an image side, the first lens unit, the second lens unit, the intermediate unit, and the final lens unit being disposed in this order from an object side to the image side, intervals between adjacent lens units being changed during zooming, wherein the first lens unit includes a negative lens G1, a negative lens G2, and a negative lens G3 disposed in this order from the object side to the image side, wherein the final lens unit includes a negative lens and a positive lens GR disposed closest to the image side, and wherein the following inequalities are satisfied:

$$0.000 < \theta gFGR - (-1.665*10^{-7}*vdGR^3 + 5.213*10^{-5}*vdGR^2 - 5.656*10^{-3}*vdGR + 0.7278) < 0.100,$$

$$0.50 < bfw/fw < 1.50, \text{ and}$$

$$-1.00 < fw/f1 < -0.55,$$

$$-0.90 < bfw/f1 < -0.40,$$

where vdGR is an Abbe number of the positive lens GR, θgFGR is a partial dispersion ratio of the positive lens GR, bfw is a distance from the image side surface of the positive lens GR at a wide-angle end, fw is a focal length of the zoom lens at the wide-angle end, and f1 is a focal length of the first lens unit.

17. The imaging apparatus according to claim 16, wherein the first lens unit and the second lens unit move during zooming.

18. The imaging apparatus according to claim 16, wherein at least one of an object side lens surface of the negative lens G1 and an image side lens surface of the negative lens G1 is aspherical.

* * * * *